(12) United States Patent
Dutson

(10) Patent No.: US 8,096,918 B2
(45) Date of Patent: *Jan. 17, 2012

(54) VARIATOR

(75) Inventor: Brian Dutson, Manchester Greater Manchester (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 569 days.

This patent is subject to a terminal disclaimer.

(21) Appl. No.: 12/096,368

(22) PCT Filed: Dec. 5, 2006

(86) PCT No.: PCT/EP2006/069349
§ 371 (c)(1),
(2), (4) Date: Nov. 10, 2008

(87) PCT Pub. No.: WO2007/065900
PCT Pub. Date: Jun. 14, 2007

(65) Prior Publication Data
US 2009/0203493 A1    Aug. 13, 2009

(30) Foreign Application Priority Data

Dec. 5, 2005  (GB) .................................. 0524795.2

(51) Int. Cl.
*F16H 15/38*    (2006.01)
(52) U.S. Cl. ................. 476/40; 476/44; 476/46
(58) Field of Classification Search ............ 476/40, 476/42, 44, 46
See application file for complete search history.

(56) References Cited

U.S. PATENT DOCUMENTS

| 1,817,159 A | 8/1931 | Morison |
| 4,735,430 A | 4/1988 | Tomkinson |
| 7,951,041 B2 | 5/2011 | Dutson |

FOREIGN PATENT DOCUMENTS

| DE | 103 38 271 A1 | 3/2005 |
| EP | 1 439 325 A2 | 7/2004 |
| GB | 380485 | 9/1932 |

(Continued)

OTHER PUBLICATIONS

PCT International Search Report, International Application No. PCT/EP2006/069349; International Filing Date, May 12, 2006; mailing date, Feb. 21, 2007 (4 pp.).

(Continued)

*Primary Examiner* — William C Joyce
(74) *Attorney, Agent, or Firm* — Blakely, Sokoloff, Taylor & Zafman LLP.

(57) ABSTRACT

A variator (10) has two races (12, 12) mounted for rotation about a common axis. Opposed, shaped faces (14, 18) of the races define an annular space containing at least one roller (38, 40) which runs upon the races to transfer drive between them. The roller is mounted on a carrier (42, 44) in such a way that its inclination to the common axis is able to change, to enable changes in variator ratio. The rollers and their carriers are controlled through a mechanism comprising a sun (46, 48) and a ring (50, 52) with which the carrier engages. Relative rotation of the sun and ring causes a tipping motion of the carrier (42, 44), so that the rollers steer themselves to a new inclination. To control the sun and ring, there is provided a planet (100) which engages them both. The rotational position of the carrier is controlled independently of its engagement with the sun and the ring.

16 Claims, 8 Drawing Sheets

FOREIGN PATENT DOCUMENTS

| | | |
|---|---|---|
| GB | 389857 | 3/1933 |
| GB | 443808 | 3/1936 |
| WO | WO 98/36191 | 8/1998 |
| WO | WO 02/079675 A1 | 10/2002 |
| WO | WO 03/062670 | 7/2003 |
| WO | WO 03/062675 A1 | 7/2003 |
| WO | WO 2005/121602 | 12/2005 |

OTHER PUBLICATIONS

Patent Act 1977: Search Report under Section 17(5), Great Britain Application No. 0524795.2 filed on Dec. 5, 2005, mailing date, Apr. 7, 2006 (1page).

VARIATOR

FIELD

The present invention relates to rolling-traction variators of the type in which drive is transmitted from one race to another by one or more rollers whose orientation is variable in accordance with changes in variator drive ratio. More particularly, the invention is concerned with a novel mechanism for control of roller orientation in such a variator.

BACKGROUND

The word "variator" is used herein to refer to a device which transmits rotary drive at a continuously variable ratio. Variators are particularly, but by no means exclusively, applicable in motor vehicle transmissions.

The best known form of rolling-traction type variator uses at least two co-axially mounted races having opposed faces which are shaped so that the races together define an approximately toroidal space. At least one roller is positioned in the space between the races and runs upon their shaped faces to transmit drive from one to the other. Changes in the inclination of the roller are associated with changes in the relative speeds of the races, and hence in the drive ratio provided by the variator.

The changes in roller inclination associated with changes in drive ratio will be referred to herein as "precession" to distinguish from other rotary motions of the roller, such as its rotation about its own axis.

Some mechanism is needed to control roller inclination, and the prior art contains numerous examples. Typically such mechanisms do not act by directly applying a torque to the roller's mountings. Instead, the roller is mounted in such a manner that displacing it causes it to steer itself; due to the forces exerted on it by the races, to a new inclination. The steering effect arises because the roller seeks a position in which its own axis coincides with the common axis of the variator races, since in any other condition the motion of the roller is non-parallel to that of the races in the area where they engage with each other. The control mechanism serves to regulate the roller's displacement.

Examples of such mechanisms are found in many of the applicant's prior published patent cases including PCT/GB03/00259 (WO 03/062670). In most, the displacement needed to cause the roller to steer itself is along the circumferential direction (about the common axis of the variator races) and, by allowing the rollers to process about an axis which is inclined to the radial plane, a relationship is established between roller displacement and roller inclination. An actuator is provided for urging the roller along the circumferential direction and so influencing (1) its displacement, and (2) the variator ratio.

Such mechanisms lend themselves to "torque control" of the variator. The concept is known in the art, but will be briefly explained. More conventional "ratio controlled" transmissions are constructed such that they receive some form of input indicating a required drive ratio, and then adjust themselves to provide it. That is, the drive ratio is directly set. By contrast, in a torque controlled transmission it is torque which is directly set. Changes in ratio result from application of the torque to inertias at the input and output, and the variator automatically accommodates such changes. The sum of the torques acting on the variator races will be referred to herein as the reaction torque, since it is the torque which must be reacted to the variator's mountings. The reaction torque is referred to the rollers, and so through their associated actuator(s) to the variator casing. Hence by setting the actuator force, the reaction torque itself is directly set, since (neglecting roller acceleration) the forces exerted on each roller by the actuator and the races must be equal and opposite. Control over the transmission is exercised by controlling actuator force—and hence reaction torque—not variator ratio.

The most widely adopted control mechanism uses a respective hydraulic piston/cylinder type actuator for each roller, the piston being coupled through a piston rod to a carriage carrying the roller. However, a quite different type of mechanism is described herein, in which the variator has a sun and a ring and the roller carrier engages with both. Relative rotation of the sun and ring causes a tilting motion of the carrier, and hence causes the roller to steer itself to a new orientation. In this type of arrangement, driving the sun is problematic. Some coupling needs to be made to the sun for this purpose and in principle this could be made along an axial direction—e.g. through some sleeve extending along the variator's shaft—or along a radial direction—e.g. through an arm extending through the toroidal cavity. The former option creates design difficulties. The latter is problematic because the arm would foul the rollers and/or their carriers as they move back and forth.

SUMMARY

In accordance with a first aspect of the present invention, there is a variator comprising a pair of races mounted for rotation about a common axis and having respective shaped faces which together define an annular cavity containing at least one roller which runs upon the shaped faces of the races to transfer drive from one race to the other, the roller having a roller axis and being mounted upon a carrier through bearings which permit the roller to spin about its axis and also to precess relative to the carrier to change the inclination of the roller axis to the common axis and so to enable changes in variator ratio, the variator further comprising a sun and a ring which are concentric with and mounted for rotation about the common axis, the carrier engaging with the sun and the ring so that relative rotation of the sun and ring causes a tilting motion of the carrier and a consequent change in the inclination of the roller axis, the variator further comprising a mechanism for controlling rotation of the sun and ring, the mechanism comprising a planet which is mounted in the annular cavity and which operatively engages with the sun and the ring, an actuator which is operatively coupled to the planet, and an arrangement for controlling rotation of the planet independently of its engagement with the sun and the ring.

By controlling the planet's rotation independently of its engagement with the sun and the ring, the planet can be used to control movement of both the sun and the ring. The planet can also move along with the sun and ring, and as a result problems of fouling at the rollers etc. by the planet can be avoided.

Whilst it is necessary in some way to control rotation of the planet independently of its engagement with the sun and the ring, this should not be taken to imply that a mechanism must be provided for rotating the planet. In a preferred embodiment, the arrangement serves simply to prevent the planet from rotating. In such embodiments, the actuator is preferably arranged to move the planet along a circumferential direction of travel, about the common axis. It is this circumferential movement of the planet which produces the relative rotation of the sun and the ring needed to control tilting of the carrier and hence variator ratio.

The path of movement of the planet is typically an arc of a circle about the common axis. In preferred embodiments the arrangement for controlling rotation of the planet comprises for example a tongue slidably received in a slot. In this way some movement of the planet transverse to its direction of travel can be accommodated.

The actuator itself is preferably a linear actuator, still more preferably a hydraulic piston and cylinder arrangement. The most preferred embodiments comprise a pair of pistons in respect of cylinders.

Coupling between the planet and the actuator may be made through complimentary sliding parts which accommodate some movement of the planet in a direction transverse to the actuator's direction of travel while transmitting the actuator force to the planet and preventing the planet from rotating.

It is particularly preferred that the sun, ring and planet are toothed to form an epicyclic gear set.

The present invention is well adapted to use in a torque controlled variator. This can be achieved simply by directly controlling the force applied by the actuator to the planet, which in turn directly controls the reaction torque of the variator.

Preferably the ring comprises an annular outer part and at least one radially extending limb leading to an inner hub part. The hub part may be journalled about the common axis, to mount the ring.

It is particularly preferred that the planet is operatively coupled to the ring through a control member which extends radially outwardly from the hub part of the ring. By transmitting the torque required to control rotation of the ring to its hub part, which can be supported through its bearing, problems of distortion of the outer part of the ring can be avoided.

Preferably in such an embodiment the control member has a toothed outer part which meshes with a toothed outer part of the planet.

In accordance with a second aspect of the present invention, there is a variator comprising a pair of races mounted for rotation about a common axis and having respective shaped faces which together define an annular cavity containing at least one roller which runs upon the shaped faces of the races to transfer drive from one race to the other, the roller having a roller axis and being mounted upon a carrier through bearings which permit the roller to spin about its axis and also to precess relative to the carrier to change the inclination of the roller axis to the common axis and so to enable changes in variator ratio, the variator further comprising a sun and a ring which are concentric with and mounted for rotation about the common axis, the carrier engaging with the sun and the ring so that relative rotation of the sun and ring causes a tilting motion of the carrier and a consequent change in the inclination of the roller axis, the variator further comprising a mechanism for controlling rotation of the sun and ring, the mechanism comprising a planet which is mounted in the annular cavity and which operatively engages with the sun and the ring, and an actuator which is operatively coupled to the planet to move it along a circumferential direction about the common axis, the planet being mounted in a manner which prevents it from rotating.

In accordance with a third aspect of the present invention, there is a variator comprising two races mounted for rotation about a common axis and having shaped, opposed faces defining an annular space containing at least one roller which runs upon the races to transfer drive between them, the roller being mounted on a carrier such that its inclination to the common axis is variable to enable changes in variator drive ratio, the variator further comprising rotatably mounted sun and ring parts with which the carrier engages so that relative rotation of the sun and ring causes a tipping motion of the carrier and a consequent change in roller inclination, and a planet which engages with both the sun and the ring to control their positions, the rotational position of the planet being controlled independently of its engagement with the sun and the ring.

BRIEF DESCRIPTION OF THE DRAWINGS

Specific embodiments of the present invention will now de described, by way of example only, with reference to the accompanying drawings, in which.

DETAILED DESCRIPTION

Figure 1:
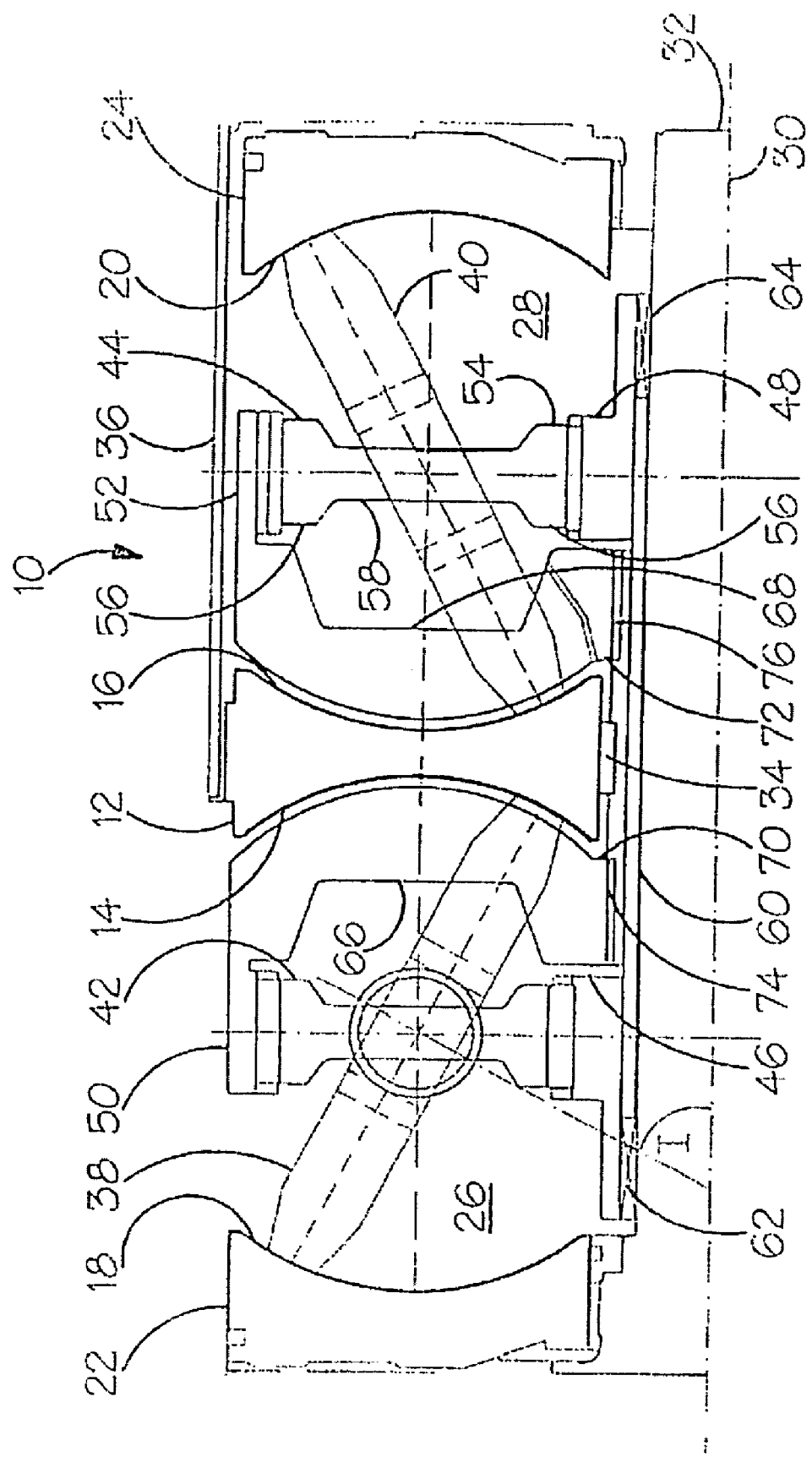
FIG. 1 is a section in an axial plane through a first variator embodying the present invention, showing only half of the variator, to one side of its axis.
Figure 2:
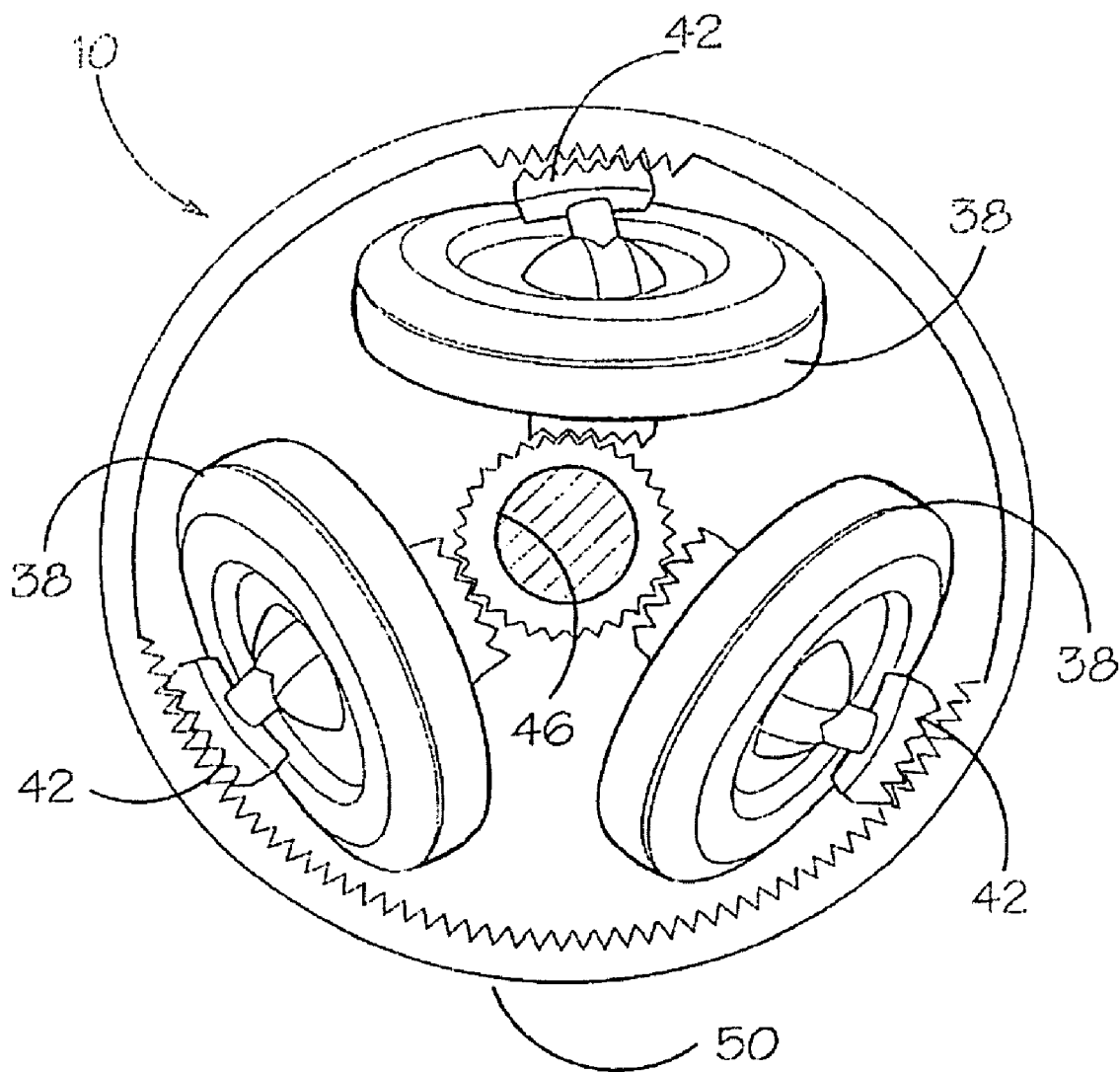
FIG. 2 is a view of the same variator along an axial direction, one of the variator's races being omitted to reveal interior parts. This drawing also omits the mechanism used to drive the sun and ring.
Figure 3:
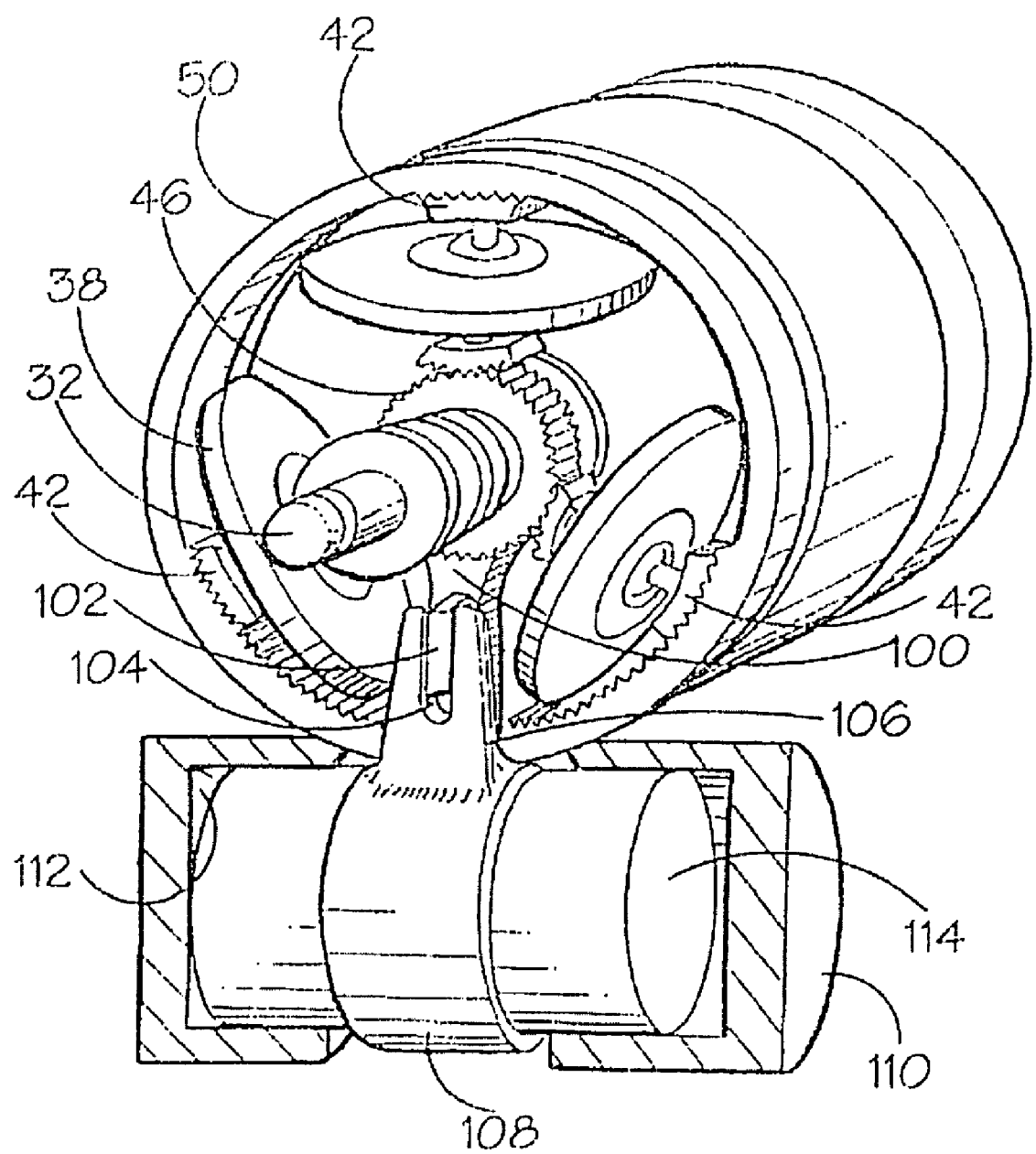
FIG. 3 is a perspective illustration of the same variator, again omitting one of the races but including the mechanism used to drive the sun and ring.

The general construction of the present variator 10 can be appreciated from FIGS. 1 to 3. It is of toroidal-race, twin cavity type, having an inner race 12 whose semi-toroidally recessed surfaces 14, 16 respectfully face toward similarly shaped surfaces 18, 20 of outer races 22, 24 to define approximately toroidal cavities 26, 28. The races are mounted for rotation about a common axis 30 defined by a main shaft 32. The outer races 22, 24 are splined to the shaft and so rotate along with it. The inner race is mounted upon a rotary bearing 34 and so is rotatable relative to the shaft. It carries on its outer periphery a rotor 36, through which rotary drive is transferred to/from the inner race.

Each cavity 26, 28 contains a set of rollers 38, 40. In the present embodiment there are three rollers per cavity. The rollers run upon the recessed surfaces 14, 16, 18, 20 of the races and so serve to transfer drive between them. The inclination of roller 38 to the common axis 30 is represented in FIG. 1 by the angle I. Precession of the rollers changes roller inclination I and accordingly, since it results in a change of the relative lengths of the circular paths traced upon the respective races by each of the rollers, changes the relative speeds of the inner and outer races 12, 22, 24. Hence drive is transferred between the main shaft 32 and the rotor 36 at a continuously variable ratio.

To provide traction between the rollers and the races, they must be biased toward each other. This is typically achieved using a hydraulic or mechanical "end load" arrangement to urge one race axially toward its fellows. The end load arrangement is not shown herein, but examples can be found in international patent application PCT/GB02/01551, Torotrak (Development) Ltd, publication no. WO02/079675. The rollers and races do not make contact with each other, but instead are constantly separated by a thin film of traction fluid, maintained by ejecting fluid onto them. Again, the means used to supply the traction fluid is not directly relevant for present purposes and is not shown herein, but suitable arrangements can be found in Torotrak (Development) Ltd's international patent application PCT/GB03/00281, published under no. WO03/062675.

Figure 4:
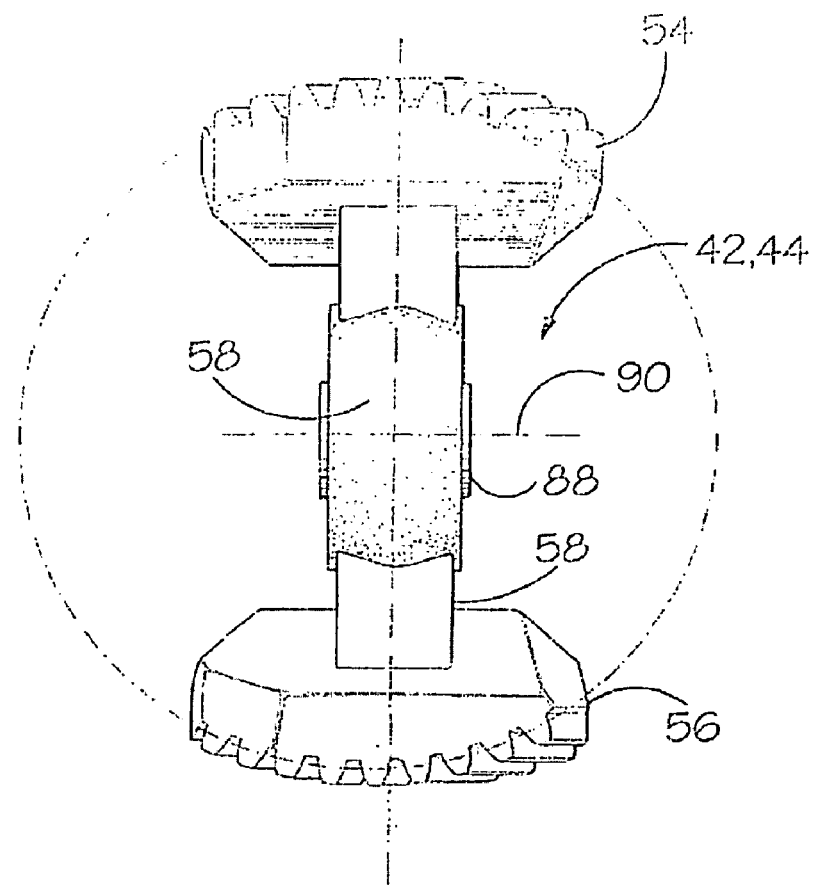
FIG. 4 shows a carrier part.
Figure 7:
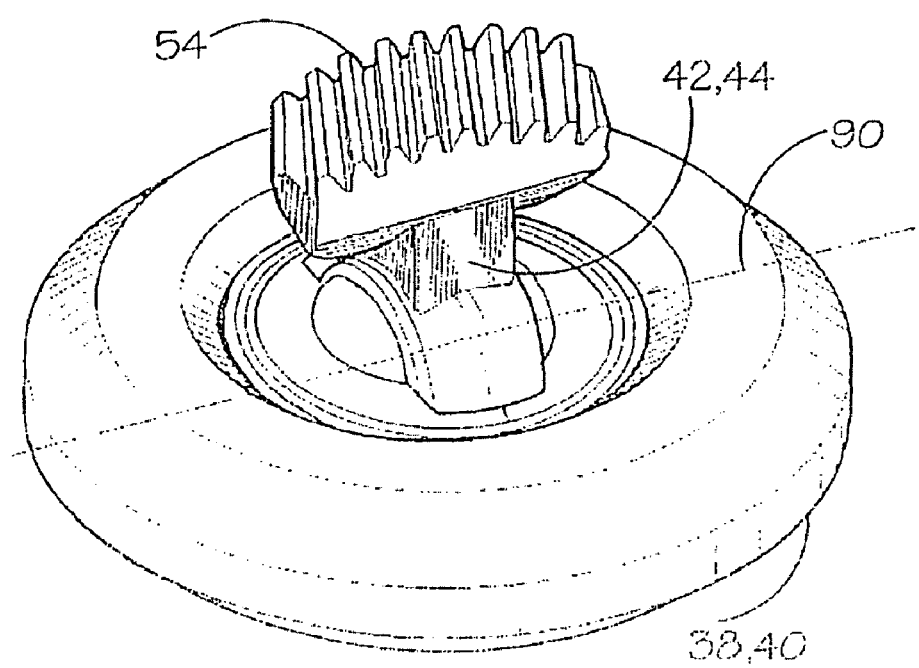
FIG. 7 shows an assembly comprising the carrier, roller and bearing.

Each roller 38, 40 is carried upon a respective carrier 42, 44. Both cavities 26, 28 contain a respective sun 46, 48 and a respective ring 50, 52. The suns and the rings are co-axial with and rotatable about the common axis 30. The sun is radially inboard of the ring. Between themselves each sun/ring pair defines an annulus in which the carriers 42, 44 are mounted by engagement with the sun and ring. In the present embodiment the suns, rings and carriers are toothed in the manner of gear wheels so that together they form what is in effect an epicyclic gear arrangement. The ring's teeth are internal and it forms an annular gear wheel. The teeth need not be continuous around the entire inner circumference of the ring, since the range of motion of the ring is limited. Likewise the carriers do not require a complete circular outer periphery since they move only through a limited angular range. Hence the carriers 42, 44 are each formed with a radially inner part-circular portion 54 coupled to a radially outer part-circular portion 56 through a limb 58 (see FIG. 4 in particular). This formation of the carriers allows them to fit into the available space without fouling other parts such as the rollers themselves.

The suns 46, 48 in the two cavities 26, 28 are coupled to each other through a sleeve 60 passing through the inner race 12, so that they rotate together. Note that the inner race 12 is consequently journalled upon the sleeve, rather than directly on the main shall 32. The sleeve 60 is itself journalled on the main shaft 32 by virtue of two bearings 62, 64 in the respective cavities 26, 28. Each of the rings 50, 52 is coupled through radially extending limbs 66, 68 to a respective hub 70, 72 and in this way is rotatably mounted, through a respective bearing 74, 76, upon the sleeve 60. The limbs 66, 68 are shaped and positioned to avoid fouling the rollers etc. within the cavities.

Each roller 38, 40 is mounted upon its carrier 42, 44 through a bearing arrangement which allows the roller two degrees of freedom: (1) the roller is able to rotate about its own axis and (2) the roller is able to precess, to change its inclination and hence the variator ratio. The bearing arrangement will now be described with reference to FIGS. 4 through 7.

Figure 5:
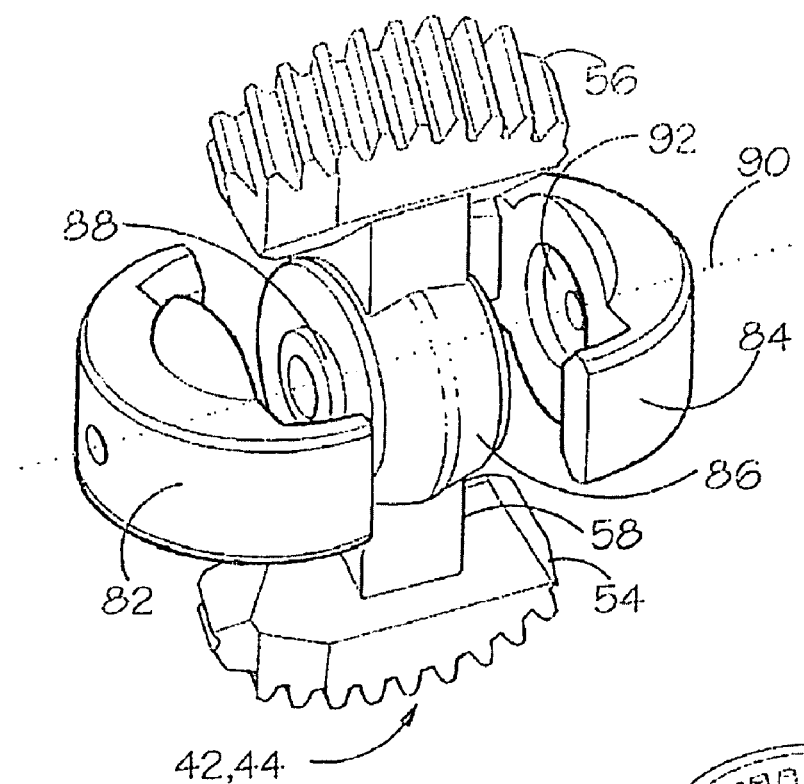
FIG. 5 shows an exploded assembly comprising the carrier part and a bearing race.
Figure 6:
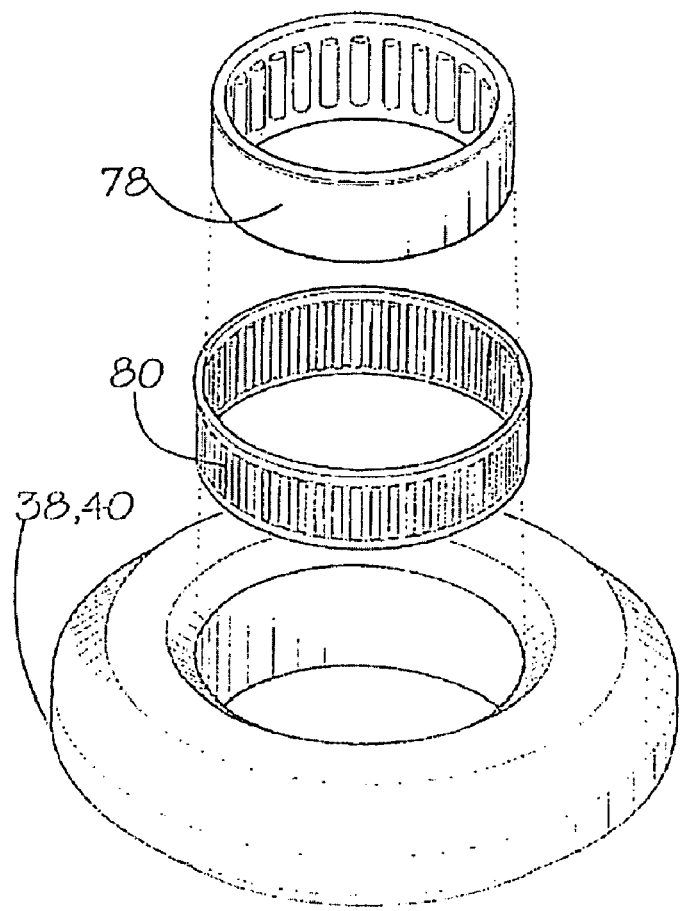
FIG. 6 shows an exploded assembly comprising a variator roller and associated bearing parts.

Rotation of the roller 38 about its own axis is provided for by means of a needle bearing 78 (FIG. 6) received in the roller's central bore. Between the roller and the bearing is a tolerance ring 80. By virtue of a corrugated construction, the tolerance ring provides some compliance between the roller 38 and the bearing 78. In use the roller is subject to a large force along its diameter by the variator races, and is deformed somewhat as a result. The tolerance ring resiliently deforms to accommodate the roller deformation and so ensures that the compressive force is borne principally by the roller itself, rather than being passed on to the bearing. The inner race of the bearing is formed in two parts 82, 84 assembled around a hub 86 (FIG. 5). The two race parts may for example be welded together, followed by machining of their outer circumference to provide the regular circular surface required of the inner bearing race. Alternatively they could be secured together by a circular band around their circumference (not shown) which would provide the bearing surface. Circular spigots 88 project from either side of the hub 86 and are concentric with and aligned along a precession axis 90. The spigots are received in complementary circular recesses 92 in inner faces of the respective inner race parts 82, 84. The construction permits the inner bearing race 82, 84, and the roller carried upon it, to precess relative to the carrier 42, 44 about precession axis 90.

It is important to note that the precession axis does not lie in a radial plane (i.e. a plane which is perpendicular to the common axis 30 of the variator races, such as the plane of the paper in FIG. 2). Instead the precession axis is inclined to such a plane, to form what is referred to as the castor angle. The point is best understood from FIG. 4, which shows the carrier 42, 44 along a direction perpendicular to the precession axis 90. The carrier's gear teeth are seen to be inclined to the precession axis rather than perpendicular to it. This angle of the gear teeth determines the castor angle between the precession axis and the radial plane. The castor angle has an important bearing on variator function.

Figure 8:
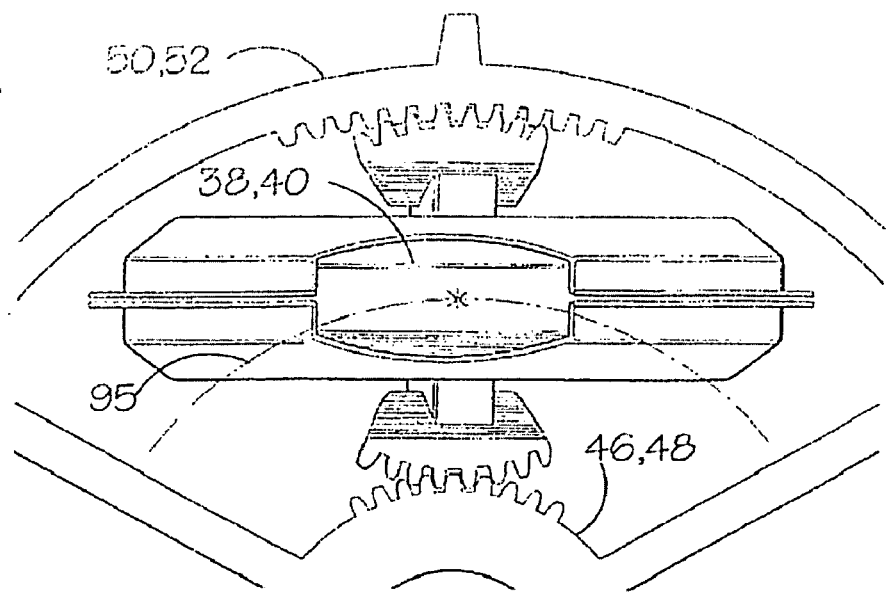
FIGS. 8 and 9 both show a roller assembly and its associated sun and ring, viewed along an axial direction.
Figure 9:
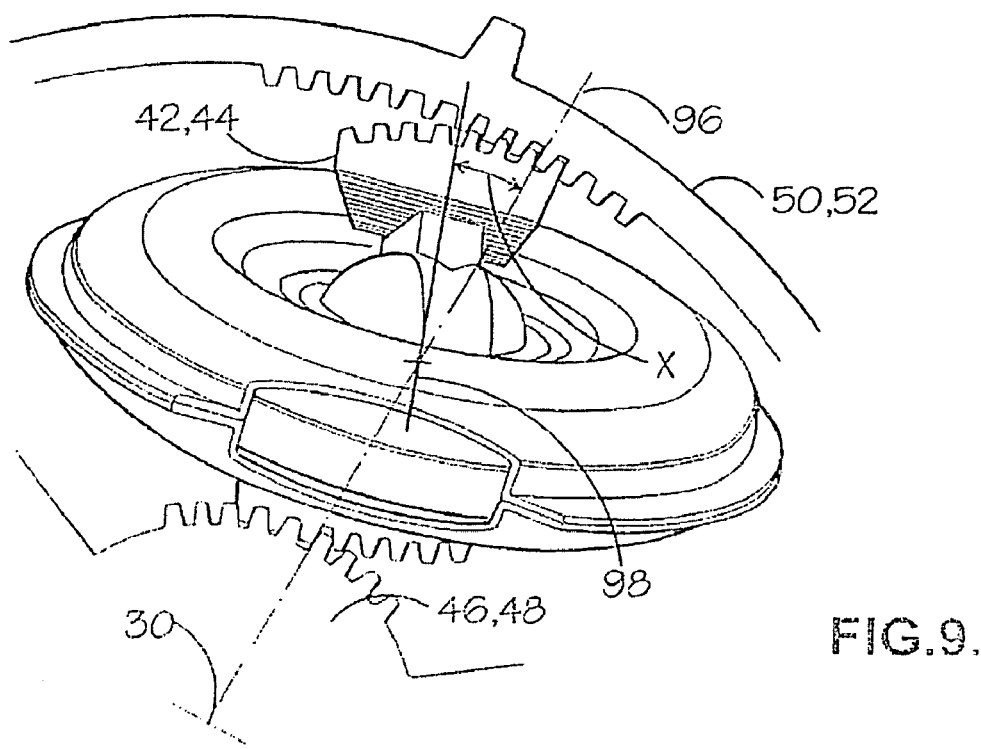

FIGS. 8 and 9 are intended to clarify the motion of the roller. In these drawings the roller 38, 40 is contained in a shroud 93, which is omitted from the other drawings for the sake of clarity.

It has already been explained that the roller has two degrees of freedom in its motion relative to its carrier. Additionally, the carrier itself has two degrees of freedom. It can (1) move along a circumferential path (dotted line 95 in FIG. 8) about the common axis 30 and (2) carry out a tilting motion. In FIG. 9 line 96 is a radial line—it passes through the common axis 30 and through the centre point of the carrier 42, 44. Line 98 is a reference line fixed with respect to the carrier. The angle X between these two lines is referred to herein as the carrier's angle of tilt. Note that if the sun 46 and ring 50 were to rotate through identical angles, the result would be that the carrier would move circumferentially, but its angle of tilt would not change, since the radius 96 and the reference line 98 would turn through identical angles. Hence there would be no roller precession and no change of variator ratio.

However, consider what happens when the 46 and ring 50 rotate through different angles. In FIG. 8, the roller's position corresponds to a 1:1 variator ratio. The carrier's tilt angle X is zero. In FIG. 9, the sun 46 and ring 50 have both been advanced clockwise, causing the roller to move along its path 95, but also the sun has advanced clockwise relative to the ring, causing the carrier 42 to tilt—the tilt angle X is now non-zero. The effect of this tilt of the carrier is to produce a transient steering effect upon the roller 38, which has thus precessed with respect to the carrier, adopting the illustrated, inclined, position and so changing the variator ratio. It should be apparent therefore that through the sun and ring 46, 48, 50, 52, control can be exercised over the variator.

Driving the sun and ring appropriately to control the variator presents a challenge, not least due to the sun's position within the variator cavity. FIG. 3 illustrates a variator provided with a suitable control arrangement embodying the present invention.

The arrangement uses a planet 100 which engages with and controls both the sun and the ring. The planet is here formed somewhat similarly to the carriers 42, 44. It has inner and outer toothed portions to engage with the sun and ring respectively and these lie on a circular locus, but the planet does not require—and does not have—a full circular periphery, and is shaped such that it can fit into the limited space between two carriers 42 without fouling them. The carrier's rotational position is not controlled by its engagement with the sun or ring. In the illustrated embodiment, it is instead prevented from rotating by engagement of a tongue 102 formed on the planet with a slot 104 formed in a control bar 106. The control bar projects laterally from a hydraulic piston 108 received in a cylinder 110. The hydraulic actuator formed by the piston and cylinder is double acting—that is, by pressurising opposed working chambers 112, 114 it be made to exert a force in either direction. The tongue and slot engagement of the planet with the control bar permits lateral motion of the planet with respect to the piston, which is necessary since the planet follows a path which is an arc of a circle.

When the piston 108 moves, the sun 46 and ring 50 are both moved, by means of the planet 100, in the same direction. However because the sun has a smaller diameter and fewer teeth than the ring, the sun moves through a greater angle. Hence the carriers 42, 44 are (a) moved along their circumferential path and (b) tilted, to change variator ratio.

This arrangement can be used to provide torque control. It provides the requisite relationship between the roller's circumferential position and the variator ratio. The net torque exerted on the rollers by the races is reacted through the piston 108, so that the force exerted by the piston is proportional to—and determines—the reaction torque.

The relationship between piston position and carrier tilt depends upon the relative sizes of the ring and sun, and can be chosen to suit other design requirements.

One possible difficulty with the drive arrangement illustrated in FIG. 3 is that the load exerted by the planet 100 upon the ring 50 can prove to be excessive. Note in this regard that the forces exerted upon the ring 50 by all six of the variator rollers are to be reacted through the single planet 100. The resultant asymmetric load can cause undesirable distortion of the ring 50. High loads can also be imposed on the sun 46, but are less problematic since the sun is a more compact and rigid component.

Figure 10:
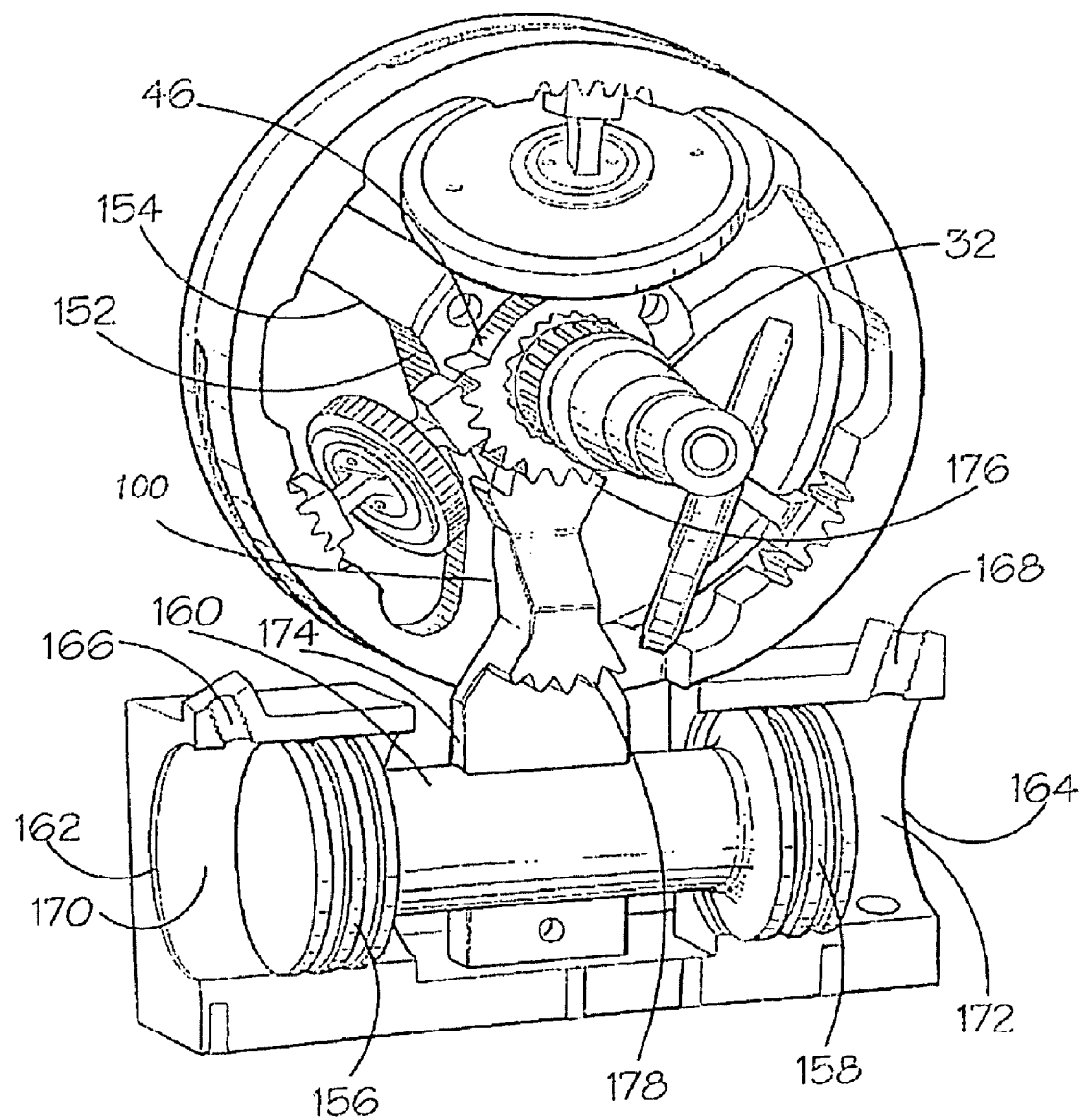
FIG. 10 is a perspective view of a second variator embodying the present invention, in which one of the variator races and a control member are omitted to reveal interior parts.
Figure 11:
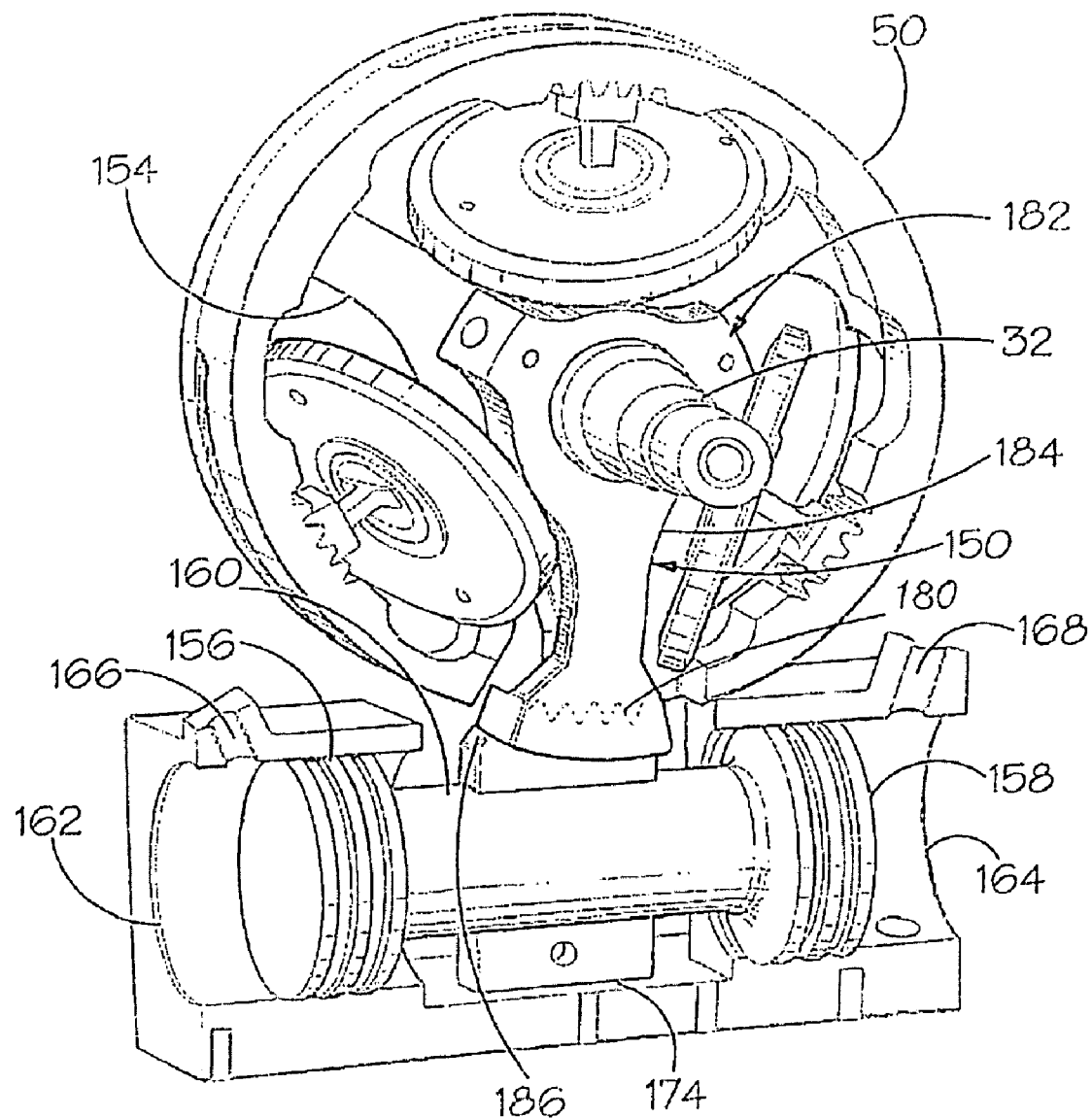
FIG. 11 corresponds to FIG. 10 but includes the control member.

In principle it would be possible to use additional planets for variator control—perhaps one per variator cavity—but this would increase constructional complexity. Instead, in the embodiment illustrated in FIGS. 10 and 11, the approach is to apply the required torque to the ring 50 through its inner portion—which can be relatively rigid and directly supported by a bearing—rather than through its less rigid outer portion. The variator seen in these drawings has much in common with the variator of FIG. 3 and the same reference numerals will be used for components common to both. FIG. 10 omits a control member 150, to reveal the parts beneath, whilst FIG. 11 includes this component.

In the present embodiment the ring 50 has an integral hub 152, which is coupled to the ring's annular outer portion through spokes 154, of which there are three in the present embodiment. The hub 152 contains a bearing (not seen in the drawings) through which the ring 50 is rotatably mounted upon the main shaft 32. The control arrangement for driving the sun 46 and ring 50 once more comprises a hydraulic actuator of double acting type, having in this embodiment a pair of piston heads 156, 158 coupled through a coupling rod 160. The piston heads 156, 158 run in respective cylinders 162, 164 and the drawings show ports 166, 168 through which hydraulic fluid—at controlled pressure—is introduced to working chambers 170, 172 within the respective cylinders. The difference in these pressures constitutes the main control signal used to regulate variator behavior, and is adjusted by means of associated hydraulics. The aforementioned pressure difference corresponds to a net force upon the coupling rod 160 and this force is transmitted to the planet 100. As in the FIG. 3 embodiment, a coupling is required between the hydraulic actuator and the planet 100 which provides for transmission of the actuator's force and which accommodates the curvature of the path taken by the planet 100 as it moves back and forth. This coupling is achieved in the present embodiment by means of a tongue 174 which is rigidly coupled to the planet 100 (they are formed as a single component in the illustrated embodiment) and which extends radially to be received in a complementarily formed slot in the coupling rod 160. By sliding along this slot slightly, the torque 174 allows the planet 100 to follow its curved path. The tongue 174 is a close fit in its slot, however, so that the coupling thus formed prevents the planet 100 from rotating.

As before a radially innermost toothed portion of the planet 100, indicated at 176 in FIG. 10, meshes with the sun 46. A radially outer toothed portion 178 of the planet 100 is operationally coupled to the ring 50, but in the present embodiment (and in contrast to the embodiment illustrated in FIG. 3) it does not mesh with the ring 50. Instead, it meshes with interior gear teeth 180 of control member 150.

The control member 150 is coupled to the ring 50 to move along with it, in the present embodiment, control member 150 has a control hub 182 which lies around the main shall 32 and is bolted to the hub 152 of the ring 50. An arm 184 of the control member 150 extends radially from the control hub 182 and terminates in a return 186 carrying gear teeth 180, which face radially inwardly, to mesh with the planet 100 as mentioned above. Thus movement of the planet 100 is transmitted through the control member 150 to the ring 50. Any tendency for asymmetric distortion of the ring 50 is reduced in this embodiment, since lateral loads are reacted through the control hub 152 to the main shaft 32.

The invention claimed is:

1. A variator comprising a pair of races mounted for rotation about a common axis and having respective shaped faces which together define an annular cavity containing at least one roller which runs upon the shaped faces of the races to transfer drive from one race to the other, the roller having a roller axis and being mounted upon a carrier through bearings which permit the roller to spin about its axis and also to precess relative to the carrier to change the inclination of the roller axis to the common axis and so to enable changes in variator ratio, the variator further comprising a sun and a ring which are concentric with and mounted for rotation about the common axis, the carrier engaging with the sun and the ring so that relative rotation of the sun and ring causes a tilting motion of the carrier and a consequent change in the inclination of the roller axis, the variator further comprising a mechanism for controlling rotation of the sun and ring, the mechanism comprising a planet which is mounted in the annular cavity and which operatively engages with the sun and the ring, an actuator which is operatively coupled to the planet, and an arrangement for controlling rotation of the planet independently of its engagement with the sun and the ring.

2. A variator as claimed in claim 1 in which the arrangement for controlling rotation of the planet serves to prevent the planet from rotating.

3. A variator as claimed in claim 1 in which the actuator is arranged to move the planet along a circumferential direction of travel about the common axis.

4. A variator as claimed in claim 3 in which the arrangement for controlling rotation of the planet is adapted to prevent the planet from rotating and to accommodate some movement of the planet along a direction transverse to its travel direction.

5. A variator as claimed in claim 4 in which the arrangement for controlling rotation of the planet comprises a tongue slidably received in a slot.

6. A variator as claimed in claim 4 in which the actuator comprises a hydraulic piston and cylinder arrangement.

7. A variator as claimed in claim 4 in which the actuator comprises a pair of pistons in respective cylinders.

8. A variator as claimed in claim 1 in which the actuator is a linear actuator.

9. A variator as claimed in claim 8 in which the actuator is coupled to the planet through complementary sliding parts which accommodate some movement of the planet in a direction transverse to the actuator's direction of travel while transmitting the actuator force to the planet and preventing the planet from rotating.

10. A variator as claimed in claim 1 in which the sun, ring and planet are toothed and form an epicyclic gear set.

11. A variator as claimed in claim 10 in which the ring comprises an annular outer part and at least one radially extending limb leading to an inner hub part.

12. A variator as claimed in claim 11 in which the hub part is journalled about the common axis, to mount the ring.

13. A variator as claimed in claim 12 in which the planet is operatively coupled to the ring through a control member which extends radially outwardly from the hub part of the ring.

14. A variator as claimed in claim 13 in which the control member has a toothed outer part which meshes with a toothed outer part of the planet.

15. A variator as claimed in claim 1 which is torque controlled.

16. A variator comprising a pair of races mounted for rotation about a common axis and having respective shaped faces which together define an annular cavity containing at least one roller which runs upon the shaped faces of the races to transfer drive from one race to the other, the roller having a roller axis and being mounted upon a carrier through bearings which permit the roller to spin about its axis and also to precess relative to the carrier to change the inclination of the roller axis to the common axis and so to enable changes in variator ratio, the variator further comprising a sun and a ring which are concentric with and mounted for rotation about the common axis, the carrier engaging with the sun and the ring so that relative rotation of the sun and ring causes a tilting motion of the carrier and a consequent change in the inclination of the roller axis, the variator further comprising a mechanism for controlling rotation of the sun and ring, the mechanism comprising a planet which is mounted in the annular cavity and which operatively engages with the sun and the ring, and an actuator which is operatively coupled to the planet to move it along a circumferential direction about the common axis, the planet being mounted in a manner which prevents it from rotating.

* * * * *